United States Patent
Kim et al.

(10) Patent No.: US 6,889,721 B1
(45) Date of Patent: May 10, 2005

(54) LIQUID CRYSTAL DISPLAY PANEL, METHOD OF FABRICATING THE SAME AND APPARATUS THEREOF

(75) Inventors: Seong Ho Kim, Kyoungsangbuk-do (KR); Woo Sup Shin, Kyoungsangbuk-do (KR); Hak Jun Lee, Daegu (KR); Yeong Geun Hwang, Daegu (KR); Tae Man Kim, Kyoungsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 20 days.

(21) Appl. No.: 10/431,375

(22) Filed: May 8, 2003

(30) Foreign Application Priority Data

Dec. 27, 2002 (KR) .................... 10-2002-0084911

(51) Int. Cl.⁷ .................................. B05D 1/06
(52) U.S. Cl. ................. 141/1; 141/11; 141/69; 141/98; 427/469; 427/483; 118/625; 118/629
(58) Field of Search .................. 141/1, 11, 69, 141/98; 427/466, 469, 475, 483; 118/625, 629

(56) References Cited

U.S. PATENT DOCUMENTS

4,971,829 A  * 11/1990  Komura et al. ............. 427/447
6,649,221 B1 * 11/2003  Tateno et al. ............... 427/469

FOREIGN PATENT DOCUMENTS

| JP | 9-203904 | 8/1997 |
| JP | 9-218412 | 8/1997 |
| JP | 9-230355 | 9/1997 |
| WO | WO99/22269 | * 5/1999 |

* cited by examiner

Primary Examiner—Gregory L. Huson
Assistant Examiner—Peter deVore
(74) Attorney, Agent, or Firm—Morgan, Lewis & Bockius, LLP

(57) ABSTRACT

An apparatus for fabricating a liquid crystal display panel includes a chamber for holding a substrate, wherein the substrate includes first and second metal patterns, a spray nozzle connected to the chamber for spraying spacers onto the substrate, wherein the spacers are charged with a predetermined polarity, and a first power supplier connected to the chamber for applying a first voltage with a positive polarity and a second voltage with a negative polarity to the first and second metal patterns of the substrate.

13 Claims, 10 Drawing Sheets

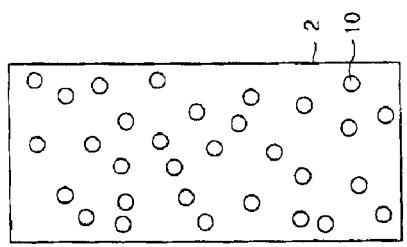
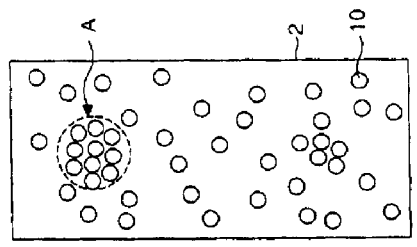

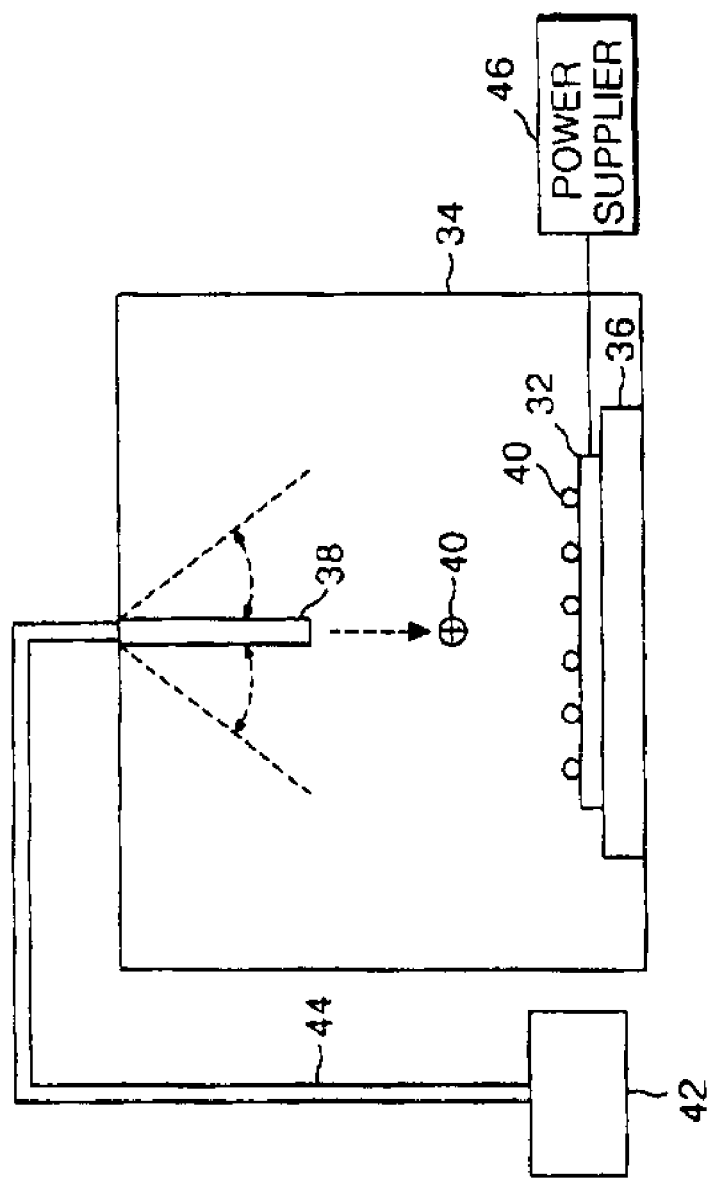

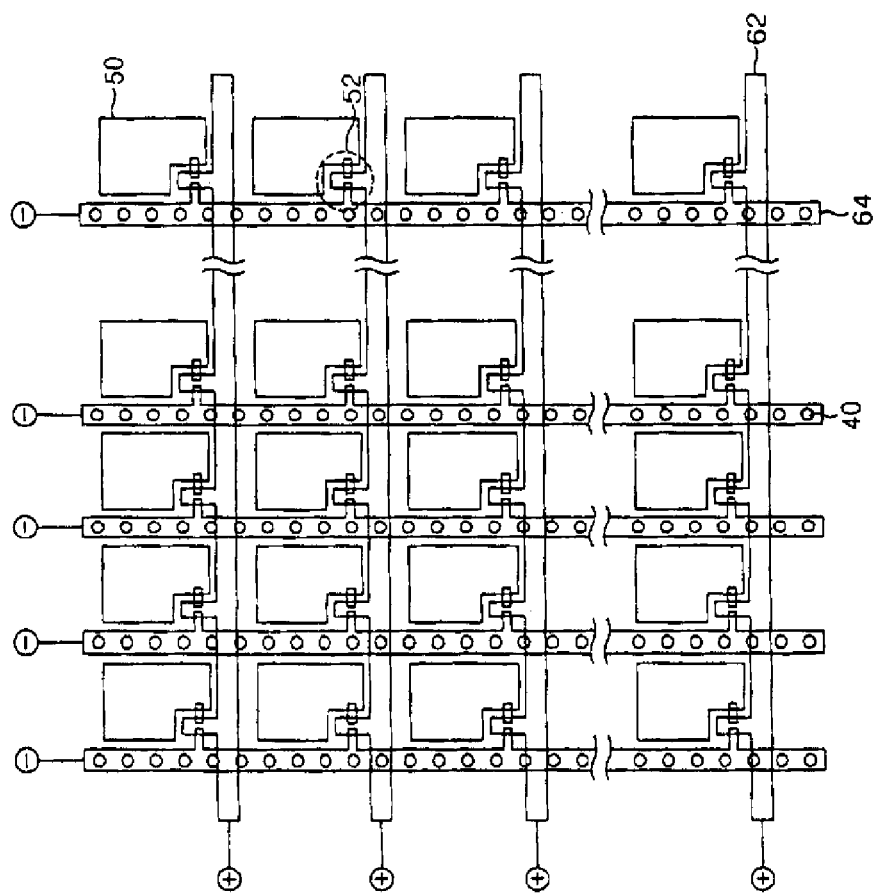

LIQUID CRYSTAL DISPLAY PANEL, METHOD OF FABRICATING THE SAME AND APPARATUS THEREOF

The present invention claims the benefit of the Korean Application No. P2002-84911 filed in Korea on Dec. 27, 2002, which is hereby incorporated by reference.

BACKGROUND OF THE INVENTION

1. Field of the Invention

The present invention relates to a liquid crystal display panel, a method of fabricating the same and an apparatus thereof, and more particularly, to a liquid crystal display panel having a spacer selectively formed at a desired area, a method of fabricating the same, and an apparatus thereof.

2. Discussion of the Related Art

In general, a liquid crystal display (LCD) controls an amount of electric field applied to a liquid crystal material layer to thereby control light transmittance of the liquid crystal material layer for displaying an image. In particular, the LCD includes a liquid crystal display panel and a driving circuit for applying a driving signal to the liquid crystal display panel. The liquid crystal display panel includes first and second glass substrates bonded to each other with a predetermined space, and a liquid crystal material layer formed between the first and second glass substrate. The first glass substrate is commonly referred to as a thin film transistor (TFT) array substrate having a plurality of gate lines arranged along one direction at a predetermined interval from each other, a plurality of data lines arranged along a direction perpendicular to the gate lines at a predetermined interval from each other, a plurality of pixel electrodes formed in a matrix-arrangement within pixel areas defined by the gate and data lines crossing each other, and a plurality of thin film transistors switched by signals of the gate lines to transfer signals of the data lines to the pixel electrodes. An alignment film is formed on top of the TFT array substrate.

The second substrate is commonly referred to as a color filter array substrate having a black matrix layer for cutting off light from a portion except in the pixel areas, an R/G/B color filter material layer for producing colored light, and a common electrode for applying a reference voltage. An alignment film is formed on top of the color filter array substrate. In addition, spacers are used to separate the first and second substrates from each other with the predetermined space therebetween, and a sealant is used to bond the first and second substrates to each other.

FIG. 1 is a cross-sectional view of a spacer spray device according to related art. In FIG. 1, a spacer spray device includes a feed box 12 connected to a chamber 4 through a pipe 14. A substrate 2, which is a thin film transistor array substrate or a color filter array substrate, is mounted on a stage 6 inside the chamber 4. A number of ball spacers 10 are initially stored in the feed box 12 outside the chamber 4, then ejected from the pipe 14 into the chamber 4, and subsequently sprayed through a nozzle 8 onto the substrate 2. The nozzle 8 moves at a specific speed to spray the ball spacers 10 onto a top surface of the substrate 2. In particular, nitrogen gas is applied to the feed box 12 through a supply line (not shown), and the ball spacers 10 stored in the feed box 12 are supplied to the pipe 14 by nitrogen gas. As the ball spacers 10 move along the pipe 14, they collide with an inner wall of the pipe 14, thereby obtaining positive (+) charges by the principle of friction.

FIGS. 2 and 3 are planar views of a substrate having spacers sprayed by the spacer spray device in FIG. 1 according to the related art. In FIG. 2, positively-charged ball spacers 10 are uniformly ejected onto a substrate 2 by the spacer spray device in FIG. 1. However, if undesired electric field is applied to metal patterns of the substrate 2, the positively-charged ball spacers 10 will cluster toward portions of the substrate 2 where a negative (−) voltage is applied. In FIG. 3, an area A of the substrate 2 is applied with a negative (−) voltage, and a number of the positively-charged ball spacers 10 then are attracted toward the area A and form a cluster. The cluster of the ball spacers 10 then become visible as a stain when the substrate is assembled as a display panel.

In addition, the ball spacers according to the related art move when the substrate experiences an external impact. Such movement then damages an alignment film covering the substrate causing unevenness in the alignment film and deteriorating the brightness of the display panel.

SUMMARY OF THE INVENTION

Accordingly, the present invention is directed to a liquid crystal display panel, a method of fabricating the same and an apparatus thereof that substantially obviates one or more problems due to limitations and disadvantages of the related art.

An object of the present invention is to provide a liquid crystal display panel that is adaptive for having a spacer selectively formed at a desired area, a method of fabricating the same and an apparatus thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for fabricating a liquid crystal display panel includes a chamber for holding a substrate, wherein the substrate includes first and second metal patterns, a spray nozzle connected to the chamber for spraying spacers onto the substrate, wherein the spacers are charged with a predetermined polarity, and a first power supplier connected to the chamber for applying a first voltage with a positive polarity and a second voltage with a negative polarity to the first and second metal patterns of the substrate.

In another aspect, a method for fabricating a liquid crystal display panel includes: providing a substrate having first and second metal patterns, applying a first voltage with a positive polarity and a second voltage with a negative polarity selectively to the first and second metal patterns, and spraying spacers onto the first and second metal patterns, wherein the spacers are charged with a first predetermined polarity.

In another aspect, a liquid crystal display panel device includes a first substrate, a second substrate having first and second metal patterns, the first and second metal patterns selectively receiving a first voltage with a positive polarity and a second voltage with a negative polarity, and a spacer between the first and second substrates, the spacer being charged to a predetermined polarity and overlapped at least one of the first and second metal patterns.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 2 and 3 are planar views of a substrate having spacers sprayed by the spacer spray device in FIG. 1 according to the related art;

FIG. 4 is a cross-sectional view of an exemplary spacer spray device according to the present invention;

FIGS. 6A to 6C are layouts of exemplary thin film transistor array substrates according to the present invention;

DETAILED DESCRIPTION OF THE EXEMPLARY EMBODIMENTS

Figure 1:
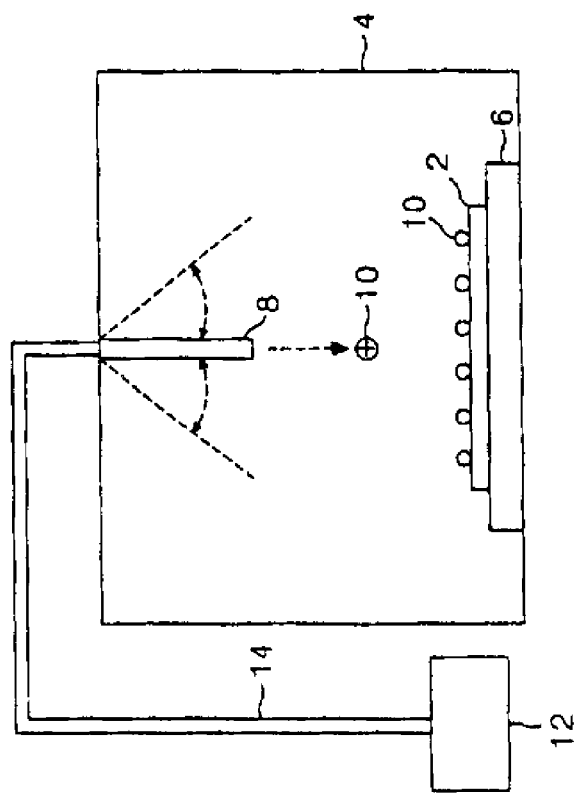
FIG. 1 is a cross-sectional view of a spacer spray device according to related art.

Reference will now be made in detail to the exemplary embodiments of the present invention, examples of which are illustrated in the accompanying drawings.

FIG. 4 is a cross-sectional view of an exemplary spacer spray device according to the present invention. In FIG. 4, a spacer spray device may include a feed box 42 connected to a chamber 34 through a pipe 44. A substrate 32, which may be a thin film transistor array substrate or a color filter array substrate, may be mounted on a stage 36 inside the chamber 34 and may be connected to a power supplier 46. The power supplier 46 may apply a voltage to metal patterns (not shown) on the substrate 32. A number of ball spacers 40 initially may be stored in the feed box 42 outside the chamber 34, then may be ejected from the pipe 44 into the chamber 34, and subsequently may be sprayed through a nozzle 38 onto the substrate 32. The nozzle 38 may move at a specific speed to spray the ball spacers 40 onto a top surface of the substrate 32.

Further, nitrogen gas ($N_2$) may be applied to the feed box 42 through a supply line (not shown), and the ball spacers 40 stored in the feed box 42 then may be supplied to the pipe 44 by the entering of nitrogen gas. As the ball spacers 40 move along the pipe 44, the ball spacers 40 may collide with an inner wall of the pipe 44, thereby obtaining positive (+) charges by the principle of friction.

Moreover, the power supplier 46 selectively may apply voltages having a positive polarity and voltages having a negative polarity to the metal patterns on the substrate 32. More specifically, the power supplier 46 may apply voltages to the metal patterns where the ball spacers 40 are sprayed to form an attractive force between the ball spacers 40 and the metal patterns. Also the power supplier 46 may apply voltages to the metal patterns where the ball spacers 40 are not sprayed to form a repulsive force between the ball spacers 40 and the metal patterns.

Figure 5:
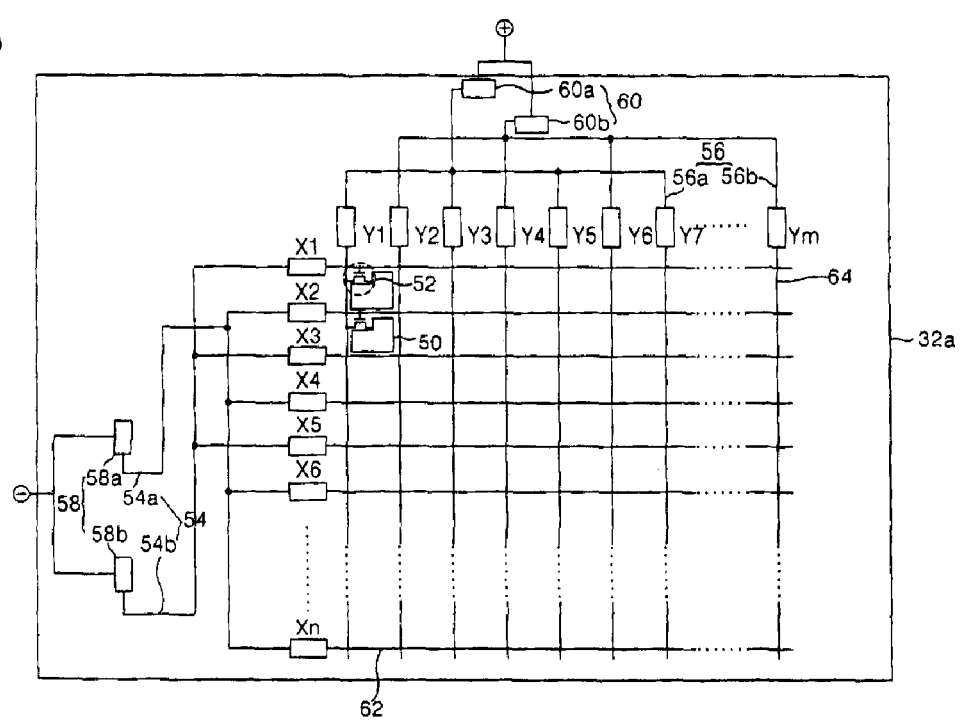
FIG. 5 is a layout of an exemplary thin film transistor array substrate according to the present invention.

FIG. 5 is a layout of an exemplary thin film transistor array substrate according to the present invention. In FIG. 5, a thin film transistor array substrate 32a may be formed by the spacer spray device shown in FIG. 4. The thin film transistor array substrate 32a may include a plurality of gate lines 62 arranged along one direction at a predetermined interval from each other, a plurality of data lines 64 arranged along a direction perpendicular to the gate lines 62 at a predetermined interval from each other, a plurality of pixel electrodes 50 formed in a matrix-arrangement within pixel areas defined by the gate lines 62 and the data lines 64 crossing each other, and a plurality of thin film transistors 52 switched by signals of the gate lines 62 to the pixel electrodes 50. The pixel areas may form a display area in the thin film transistor array substrate 32a. Further, the thin film transistor array substrate 32a may include a gate test pad 58, a data test pad 60, gate test lines 54 and data test lines 56 in a non-display area for detecting malfunction in the gate lines 62, the data lines 64 and the pixel electrodes 50. In addition, the power supplier 46 (FIG. 4) may apply voltages having a positive polarity and voltages having a negative polarity through the gate and data test pads 58 and 60 and the gate and data test lines 54 and 56 to the gate and data lines 60 and 62. In particular, the power supplier 46 may apply voltages having a positive polarity and voltages having a negative polarity that do not affect the characteristics of the thin film transistor.

Figure 6A:
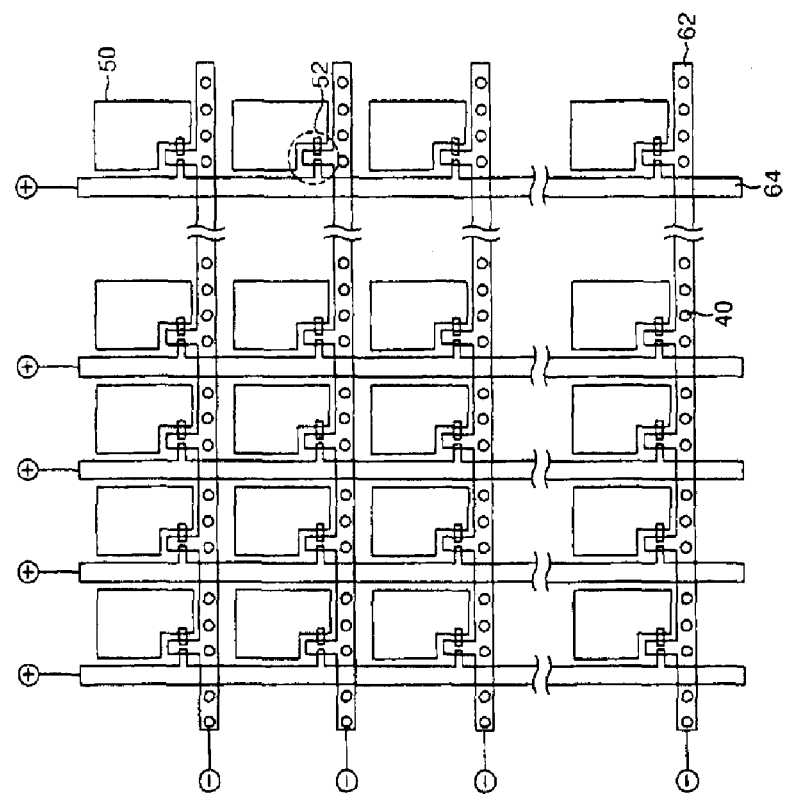
Figure 6C:
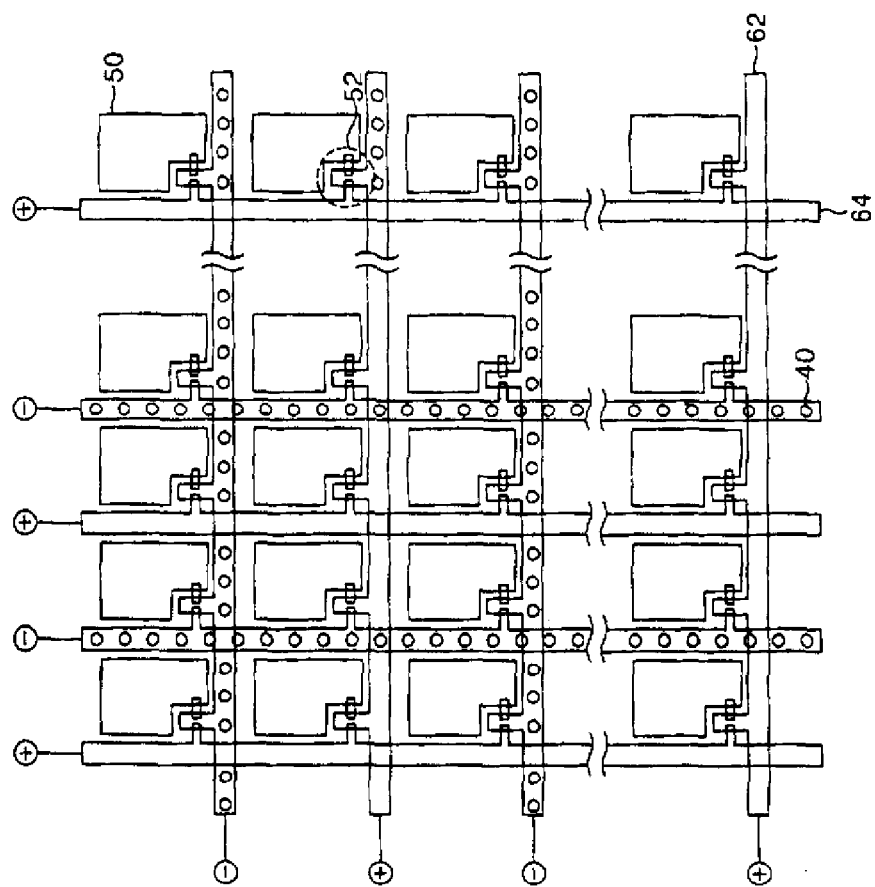

FIGS. 6A to 6C are layouts of exemplary thin film transistor array substrates according to the present invention. In FIG. 6A, in a thin film transistor array substrate, a voltage having a negative polarity may be applied through a first gate test pad 58a and a first gate test line 54a (shown in FIG. 5) to even-numbered gate lines X2, X4, X6, ... Xn (shown in FIG. 5), and through a second gate test pad 58b and a second gate test line 54b (shown in FIG. 5) to odd-numbered gate lines X1, X3, X5, ..., Xn–1, such that the gate lines 62 may become negatively-charged. Further, a voltage having a positive polarity may be applied through a first data test pad 60a and a first data test line 56a (shown in FIG. 5) to odd-numbered gate lines Y1, Y3, Y5, ..., Ym–1, and through a second data test pad 60b and a second data test line 56b (shown in FIG. 5) to even-numbered data lines Y2, Y4, Y6, ..., Ym. Accordingly, when ball spacers 40 are formed on the thin film transistor array substrate, the ball spacers 40 may be sprayed using the spacer spray device in FIG. 4 and be positively-charged. Since the positively-charged ball spacers 40 cluster around negative charges, the positively-charged ball spacers 40 may selectively overlap the negatively-charged gate lines 62, but not be present on the positively-charged data lines 64.

In FIG. 6B, in another thin film transistor array substrate according to the present invention, a voltage having a positive polarity may be applied through a first gate test pad 58a and a first gate test line 54a (shown in FIG. 5) to even-numbered gate lines X2, X4, X6, ..., Xn (shown in FIG. 5), and through a second gate test pad 58b and a second gate test line 54b (shown in FIG. 5) to odd-numbered gate lines X1, X3, X5, ... Xn–1 (shown in FIG. 5). Further, a voltage having a negative polarity may be applied through a first data test pad 60a and a first data test line 56a (shown in FIG. 5) to odd-numbered gate lines Y1, Y3, Y5, ..., Ym–1 (shown in FIG. 5), and through a second data test pad 60b and a second data test line 56b (shown in FIG. 5) to even-numbered data lines Y2, Y4, Y6, ..., Ym (shown in FIG. 5), such that the data lines 64 may be negatively-charged. Accordingly, when ball spacers 40 are formed on the thin film transistor array substrate, the ball spacers 40 may be sprayed using the spacer spray device in FIG. 4 and be positively-charged. Since the positively-charged ball spacers 40 cluster around negative charges, the positively-charged ball spacers 40 may overlap the negatively-charged data lines 64, but not be present on the positively-charged gate lines 62.

In FIG. 6C, in yet another thin film transistor array substrate according to the present invention, a voltage having a positive polarity may be applied through a first data test pad 60a and a first data test line 56a (shown in FIG. 5) to odd-numbered gate lines Y1, Y3, Y5, . . . , Ym−1 (shown in FIG. 5), and through a first gate test pad 58a and a first gate test line 54a (shown in FIG. 5) to even-numbered gate lines X2, X4, X6, Xn (shown in FIG. 5). Moreover, a voltage having negative polarity may be applied through a second data test pad 60b and a second data test line 56b (shown in FIG. 5) to the even-numbered data lines Y2, Y4, Y6, . . . , Ym, and through a second gate test pad 58b and a second gate test line 54b (shown in FIG. 5) to the odd-numbered gate lines X1, X3, X5, . . . , Xn−1, such that the even-numbered data lines Y2, Y4, Y6, . . . , Ym, and the odd-numbered gate lines X1, X3, X5, . . . , Xn−1 may be negatively-charged. Accordingly, when ball spacers 40 are formed on the thin film transistor array substrate, the ball spacers 40 may be sprayed using the spacer spray device in FIG. 4 and be positively-charged. Since the positively-charged ball spacers 40 cluster around negative charges, the positively-charged ball spacers 40 may overlap with the selectively negatively-charged gate and data lines 62 and 64. In particular, the ball spacers 40 may be formed on odd-numbered gate lines X1, X3, X5, . . . , Xn−1 (shown in FIG. 5) and even-number data lines Y2, Y4, Y6, . . . , Ym (shown in FIG. 5).

Figure 7:
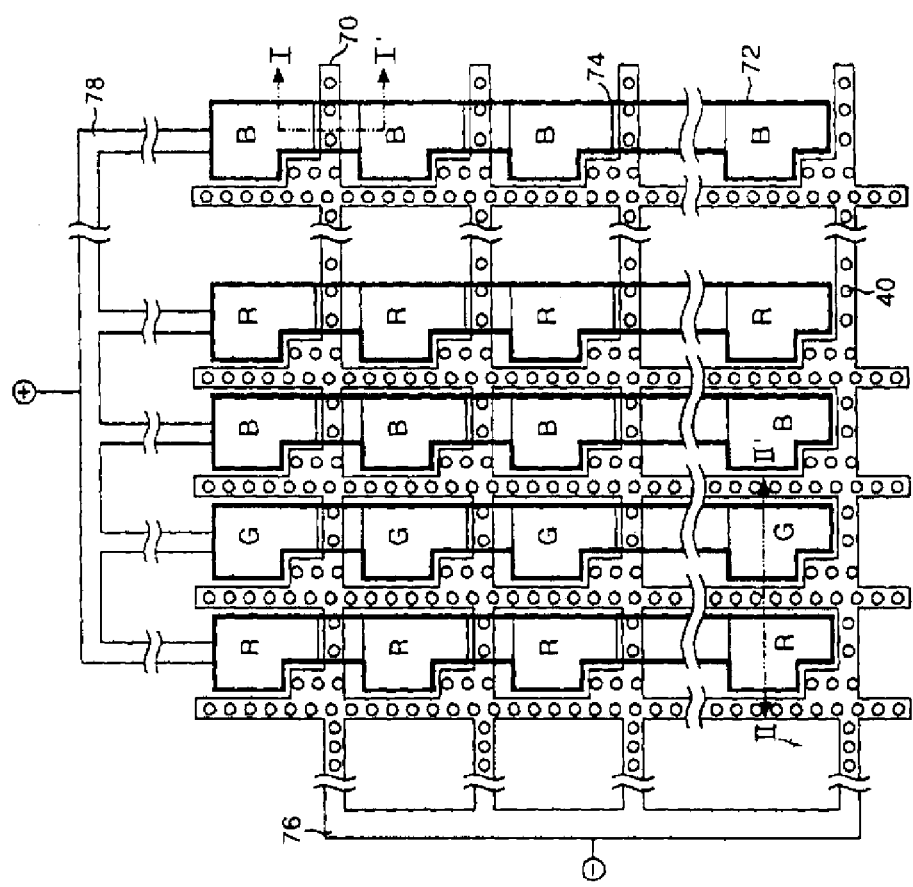
FIG. 7 is a layout of an exemplary color filter array substrate according to the present invention.
Figure 8A:
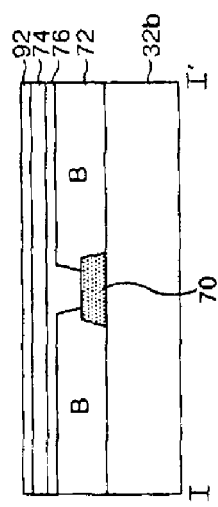
FIGS. 8A and 8B are cross-sectional views of the exemplary color filter array substrate in FIG. 7 along I–I' and II–II'.
Figure 8B:
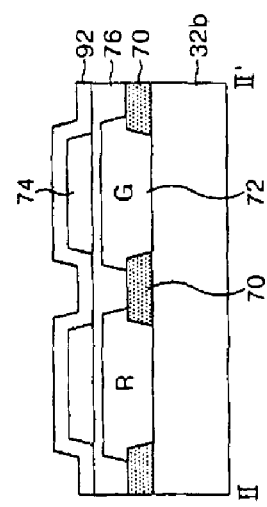

FIG. 7 is a layout of an exemplary color filter array substrate according to the present invention, and FIGS. 8A and 8B are cross-sectional views of the exemplary color filter array substrate in FIG. 7 along I–I' and II–II'. In FIG. 7, a color filter array substrate according to the present invention may include a black matrix 70, red R, green G and blue B color filters 72 located at areas which are partitioned off by the black matrix 70, and common electrodes 74 located on the color filters 72 in a stripe shape. The black matrix 70 may be formed to generally overlap gate and data lines of a corresponding thin film transistor array substrate (shown in FIG. 5). Also the black matrix 70 may include opaque metal, such as chrome. In addition, a first test line 76 may be formed extending from one side of the black matrix 70.

Further, as shown in FIGS. 8A and 8B, the common electrodes 74 may be patterned and formed between an overcoat layer 76 and an alignment film 92 to overlap the color filters 72. The common electrodes 74 may also be formed in a strip shape extending parallel to the data lines or parallel to the gate lines of the corresponding thin film transistor array substrate, as shown in FIG. 7. A second test line 78 may be formed extending from one side of the common electrodes 74.

Moreover, a voltage having a negative polarity may be applied through the first test line 76 to the black matrix 70, and a voltage having a positive polarity may be applied through the second test line 78 to the common electrodes 74. Accordingly, when ball spacers 40 are formed on the color filter array substrate, the ball spacers 40 may be sprayed using the spacer spray device in FIG. 4 and be positively-charged. Since the positively-charged ball spacers 40 cluster around negative charges, the positively-charged ball spacers 40 may overlap on the black matrix 70 but not appear on the common electrodes 74.

Figure 9:
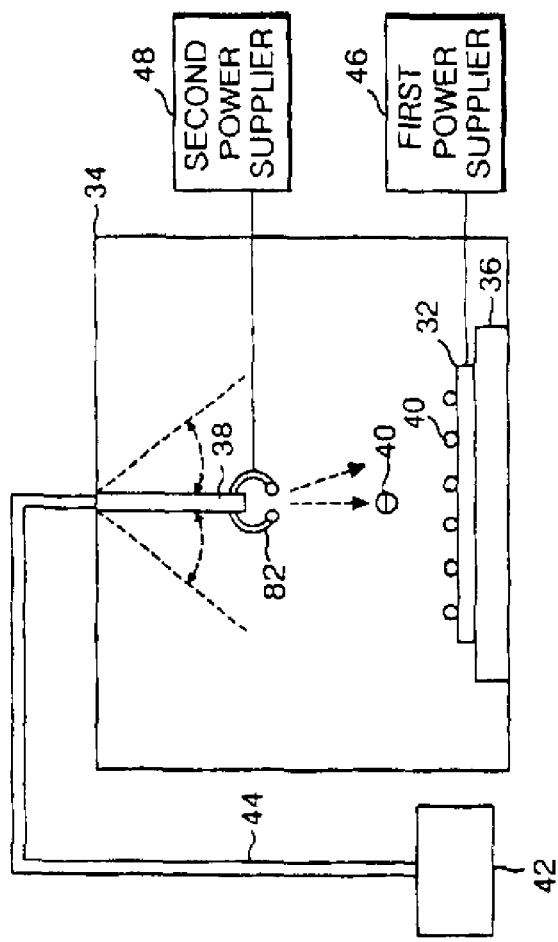
FIG. 9 is a cross-sectional view of another exemplary spacer spray device according to the present invention.

FIG. 9 is a cross-sectional view of another exemplary spacer spray device according to the present invention. In FIG. 9, a spacer spray device may include a feed box 42 connected to a chamber 34 through a pipe 44, a first power supplier 46, and a second power supplier 48. A substrate 32, which may be a thin film transistor array substrate or a color filter array substrate, may be mounted on a stage 36 inside the chamber 34 and may be connected to the first power supplier 46. A number of ball spacers 40 may be initially stored in the feed box 42 outside the chamber 34, may then be ejected from the pipe 44 into the chamber 34, and may subsequently be sprayed through a nozzle 38 onto the substrate 32. In addition, the nozzle 38 may move at a specific speed to spray the ball spacers 40 onto a top surface of the substrate 32.

Further, nitrogen gas ($N_2$) may be applied to the feed box 42 through a supply line (not shown), and the ball spacers 40 stored in the feed box 42 may then be supplied to the pipe 44 by the entering of nitrogen gas. As the ball spacers 40 move along the pipe 44, the ball spacers 40 may collide with an inner wall of the pipe 44, thereby obtaining positive (+) charges by the principle of friction.

Moreover, the nozzle 38 may be connected to the second power supplier 48. The second power supplier 48 may apply a designated voltage to electrode pins 82 formed at both sides of an opening of the nozzle 38. Thus, positive or negative ions may be formed at the electrode pins 82 to thereby ionize the positively-charged ball spacers 40 to a desired polarity as the ball spacers 40 are sprayed from the nozzle 38. For example, if the electrode pins 82 are charged with positive ions, the positively-charged ball spacers 40 may carry even more positive charges as they are sprayed from the nozzle 38. Also if the electrode pins 82 are charged with negative ions, the positive-charged ball spacers 40 may be neutralized, may carry fewer positive charges, or may carry negative charges as they are sprayed from the nozzle 38 depending on the amount of negative ions are applied to the electrode pins 82.

If the ball spacers 40 are ionized into the positive polarity by the electrode pins 82, the ball spacers 40 are sprayed on the substrate 32 having a relatively large amount of positive charge. In this case, the attractive force and the repulsive force between the ball spacers 40 and the metal patterns formed on the substrate 32 act more strongly than when the ball spacers 40 are not ionized. Accordingly, the ball spacers 40 are located on the metal pattern to which the negative voltage is applied in a manner of being relatively fixed.

If the ball spacers 40 are ionized into the negative polarity, the ball spacers 40 are sprayed on the substrate 32 having a relatively large amount of negative charge. In this case, the attractive force and the repulsive force between the ball spacers 40 and the metal patterns formed on the substrate 32 act more strongly than when the ball spacers 40 are not ionized. Accordingly, the ball spacers 40 are located on the metal pattern to which the positive voltage is applied in a manner of being relatively fixed.

Furthermore, the first power supplier 46 may selectively apply voltages having a positive polarity and voltages having a negative polarity to the metal patterns on the substrate 32. More specifically, the first power supplier 46 may apply voltages to the metal patterns where the ball spacers 40 are sprayed to form an attractive force between the ball spacers 40 and the metal patterns. Also the first power supplier 46 may apply voltages to the metal patterns where the ball spacers 40 are not sprayed to form a repulsive force between the ball spacers 40 and the metal patterns. The voltage generated from at least any one of the first and second power suppliers 46 and 48 is a voltage that may not deteriorate the characteristic of the thin film transistor.

As described above, the liquid crystal display panel, the method of fabricating the same, and the apparatus thereof according to the present invention selectively applies voltages having a negative polarity and voltages having a positive polarity to metal patterns on a substrate and selectively forms spacers on the substrate. The spacers according to the present invention are held at selective portions of the substrate by an attractive force between opposite charges. Thus, the spacers are firmly fixed to the substrate to thereby prevent any movement of the spacers, avoid damage in an alignment film covering the substrate, and prevent light leakage in a liquid crystal display panel.

It will be apparent to those skilled in the art that various modifications and variations can be made in the liquid crystal display panel, the method of fabricating the same, and the apparatus thereof of the present invention without departing from the spirit or scope of the invention. Thus, it is intended that the present invention cover the modifications and variations of this invention provided they come within the scope of the appended claims and their equivalents.

What is claimed is:

1. An apparatus for fabricating a liquid crystal display panel, comprising:

a chamber for holding a substrate, the substrate having first and second metal patterns, the first and second metal patterns arranged substantially perpendicular to each other;

a spray nozzle connected to the chamber for spraying spacers onto the substrate, wherein the spacers are charged with a predetermined polarity; and a first power supplier connected to the chamber for applying a first voltage with a positive polarity to the first metal pattern and a second voltage with a negative polarity to the second metal pattern of the substrate.

2. The apparatus according to claim 1, further comprising a pipe connected the spray nozzle to a feed box.

3. The apparatus according to claim 2, wherein the spacers are initially stored in the feed box.

4. The apparatus according to claim 3, wherein as the spacers pass through the pipe, the pipe charging the spacers with the predetermined polarity.

5. The apparatus according to claim 1, further comprising a second power supplier connected to the spray nozzle.

6. The apparatus according to claim 5, further comprising an electrode pin on at least one side of an opening of the spray nozzle, wherein the second power supplier applies a third voltage to the electrode pin.

7. The apparatus according to claim 6, wherein the third voltage has an opposite polarity as the spacers.

8. The apparatus according to claim 7, wherein the spacers are positively-charged and the third voltage has a negative polarity.

9. The apparatus according to claim 1, wherein the spacers are positively-charged.

10. A method for fabricating a liquid crystal display panel, comprising:

providing a substrate having first and second metal patterns, the first and second metal patterns arranged substantially perpendicular to each other;

applying a first voltage with a positive polarity to the first metal pattern and a second voltage with a negative polarity to the second metal pattern; and spraying spacers onto the first and second metal patterns, wherein the spacers are charged with a first predetermined polarity.

11. The method according to claim 10, wherein the spraying includes ionizing the spacers to a second predetermined polarity by a charged electrode pin before the spacers are sprayed onto the first and second metal patterns.

12. The method according to claim 11, where the first predetermined polarity is different from the second predetermined polarity.

13. The method according to claim 10, wherein the first predetermined polarity is a positive polarity.

* * * * *